Oct. 4, 1949.  E. SCHOTTLAND  2,483,785
METHOD OF MAKING SKYLIGHTS
Filed Nov. 18, 1942  2 Sheets-Sheet 1
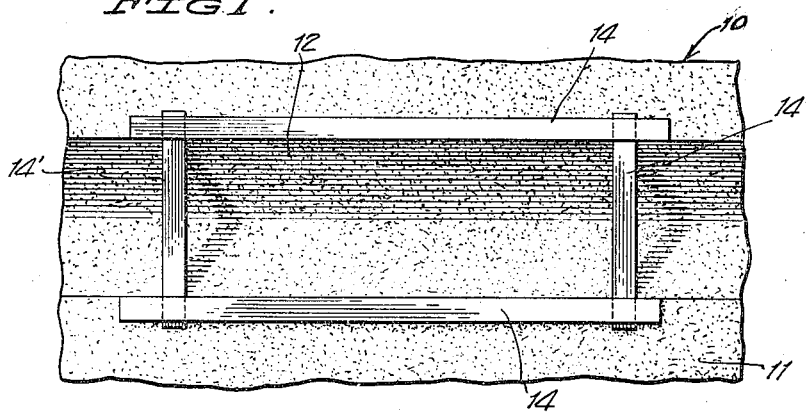
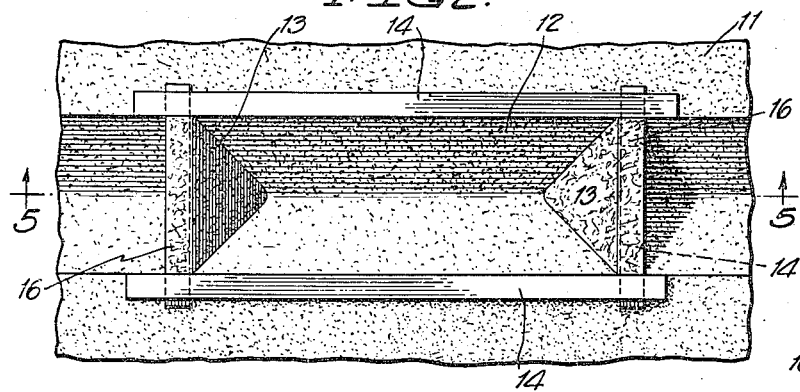
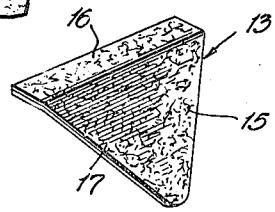
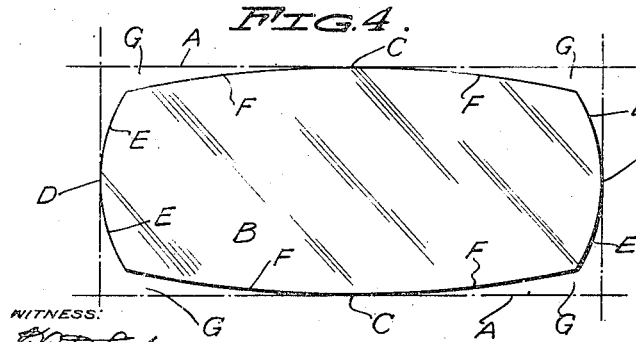
INVENTOR.
EDWARD SCHOTTLAND.
BY
ATTORNEYS.

Oct. 4, 1949.   E. SCHOTTLAND   2,483,785
METHOD OF MAKING SKYLIGHTS
Filed Nov. 18, 1942   2 Sheets-Sheet 2
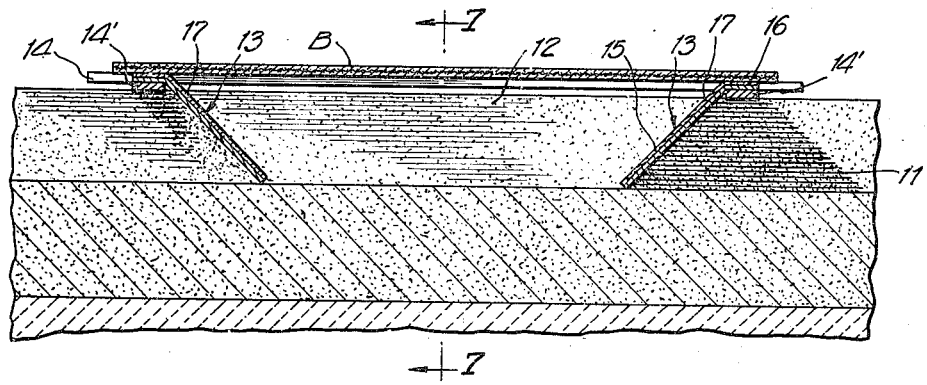
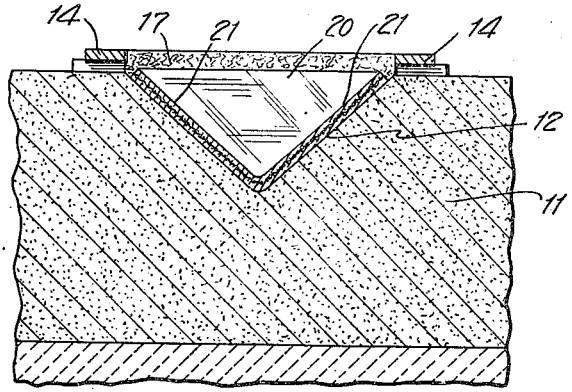
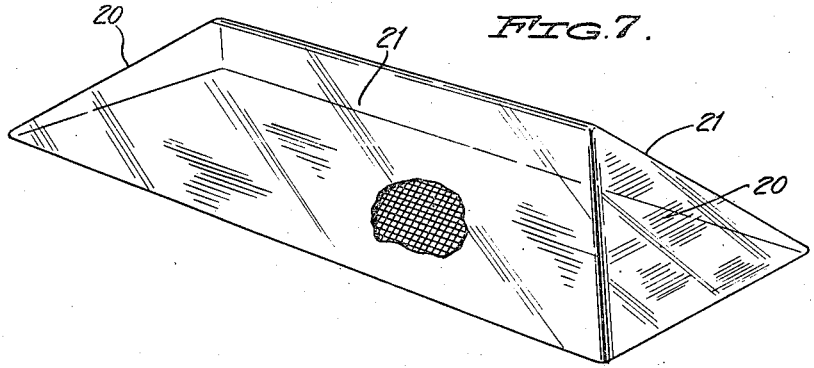
INVENTOR.
EDWARD SCHOTTLAND.
BY Ely Pattison
ATTORNEYS.

Patented Oct. 4, 1949

2,483,785

UNITED STATES PATENT OFFICE 2,483,785

METHOD OF MAKING SKYLIGHTS

Edward Schottland, Forest Hills, N. Y., assignor of one-half to Robert Schottland, Jackson Heights, N. Y.

Application November 18, 1942, Serial No. 465,984

4 Claims. (Cl. 49—84)

1

This invention relates to a new and improved method of bending glass to produce certain types of articles which, in so far as I am aware of the prior art, have been heretofore constructed of flat or substantially flat plates of glass held in position by metal frames.

One good example of such devices is the well known skylight.

Skylights as generally constructed consist of a metal framework utilized to support flat plates or panes of glass in angular relation to one another to produce a dome or similar structure.

Such structures have disadvantages among the most prominent of which are inability to maintain them weathertight and damage by cracking of the glass plates or panes.

Both of these disadvantages are inherent in the conventional type of skylight aforementioned and both result mainly from the same cause namely, difference in the coefficients of expansion of the metal framework and the sections of the glass carried thereby.

It is one object of the present invention to provide a new and improved method for treating a flat sheet of glass to reshape the same into a dome-like structure having integrally connected sections arranged in angularly related planes.

In the present instance, I have illustrated the invention as applied to the manufacture of a skylight dome or housing, but it is to be understood that the invention is not to be so limited or restricted since it may be employed in the manufacture of articles for other uses as well.

In the accompanying drawings, I have illustrated the finished article, the apparatus and the manner or steps in the production of said article.

In said drawings,

Figure 1 is a top plan view of a glass bending mould of the fire clay type,

Figure 2 is a top plan view of a mould of the fire clay type as prepared for use in connection with the present invention, Figure 3 is a perspective view of one of the mould elements employed in connection with the present invention, Figure 4 is a plan view illustrating in dot and dash lines, a rectangular flat sheet of glass, and in full lines, the shape to which the sheet is reduced prior to treatment, Figure 5 is a central longitudinal sectional view

2 illustrating the sheet of glass shown in full lines in Figure 4 in position upon the mould, prior to the heat treating step of the method, Figure 6 is a transverse sectional view thereof taken substantially on the line 7—7 of Figure 5, but after the heat treating step, and;

Figure 7 is a perspective view of a skylight dome formed in accordance with the present invention with a portion broken away to illustrate the reenforcing wire mesh embedded in the glass material from which the dome is constructed.

Referring to the drawings by reference character, 10 designates a conventional type of glass bending mould including the body of finely divided and densely packed fire clay designated 11.

In this type of mould, the mould cavity 12 is formed to the desired shape by removing a portion of the fire clay generally by a scraping action with a suitably shaped scraper. In use, the glass sheet to be bent is placed upon side supporting bars 14, see Figure 2, in bridging relation to the cavity 12 and when subjected to the heat treatment, the sheet of glass sags into the cavity, eventually conforming to the shape thereof after which it is removed from the mould.

In carrying out the present invention, I provide, in the usual manner, an elongated cavity which is substantially V-shaped in cross-sectional form such as illustrated in Figure 6 of the drawings.

After the mould cavity has been formed as above described, I introduce thereinto elements which I will hereinafter refer to as end plates 13.

One of the end plates is illustrated in Figure 3 of the drawings, and it comprises a substantially triangular shaped body portion 15 along one edge of which extends a flange or lip 16 which extends angularly with relation to the body portion 15.

Two end plates 13 are employed and as illustrated in Figure 2 of the drawings, they are spaced from each other to form the end walls of the mould cavity. Their main body portion conforms to the cross-sectional shape of the mould cavity and the flanges or lips rest upon transversely extending supporting bars 14' which bridge the cavity 12 and support the end plates in position.

The end plates are preferably formed from metal and as best illustrated in Figures 3 and 5, they are provided upon their inner face, when in position in the mould, with a facing sheet 17.

The facing sheet 17 conforms both in shape and size to the end plate and it forms means for preventing too rapid heat transfer between the glass being operated upon and the metal from which the end plates are formed.

Asbestos paper is one good example of the material from which the facing sheets 17 may be formed and I have found in actual practice that good results may be obtained with relatively thin sheets of asbestos.

In Figures 2, 3 and 5, a bending mould formed in accordance with the present invention is illustrated and by reference to said figures, it will be apparent that the mould cavity is V-shaped in cross-sectional form and has angularly disposed triangularly shaped end walls which are formed by the end plates 13.

The glass to be operated upon is supported over the cavity of the mould in the form of a flat sheet or plate, which rests upon a frame formed by the supporting bars 14 and 14' and overlapping flanges 16 in the manner illustrated in Figure 5 of the drawings. When the mould, with the glass in position, as illustrated in Figure 5, is subjected to the heat treatment, the glass sags into the cavity of the mould conforming to the shape thereof as illustrated in Figure 6 of the drawings.

In so far as described, the method herein employed is substantially the same as that employed in the bending of flat sheets of glass into curved forms for store windows and similar purposes.

However, such curved plates as above mentioned do not have a multiplicity of plane or flat sections positioned in angularly related planes as does a skylight or similar dome-like structure and it has been determined by actual practice that it is not practical to form such articles by the conventional method above.

The reason for this is that a rectangular sheet of glass, the same as metal or paper, has fixed dimensions.

When a plate or sheet of such material is transformed from its flat form to a dome shape or similar form, in which there are sections disposed in angularly related planes, some provision must be made for the disposal of the excess material at the corners or meeting edges of the angularly related sections.

In most materials, this is accomplished either by folding the material upon itself in plaits at these points or by forming incisions and permitting the sections at these points to overlap or by removing V-shaped sections from the sheet and subsequently riveting or welding the meeting edges after the article has been formed.

Obviously, none of the foregoing methods are practical in the manipulation of glass and similar materials.

I have found in actual practice that if a skylight or similar dome-shaped article is formed from a rectangular sheet of glass treated by the method commonly employed in the manufacture of curved sections of glass, the excess material at the meeting edges of the angularly related sections is forced out of the mould by distortion of the main portion of the sheet and that the defining edge of the open side of the resultant product is irregular and its character cannot be definitely determined and which is impossible at times to trim to the desired dimensions.

I have also found in actual practice, that by a pre-treatment of the sheet of glass to be operated upon, the character and dimension of the defining edge of the open side of the finished article may be definitely determined.

The foregoing result is obtained by a pre-shaping of the glass sheet in such a manner that distortion of the main body portion thereof under the influence of heat will cause the excess material at the meeting edges of the several sections to displace itself into such positions that it will fill out the sections in such a manner as to produce a defining edge for the open side of the finished article, the dimension and character of which edge may be predetermined.

In Figure 4 of the drawings, there is illustrated in dot and dash lines A, a rectangular sheet of glass having a wire mesh reenforcing screen embedded therein, and in full lines B, the same sheet is illustrated after it has been prepared for a mould to form, in this instance, a skylight dome.

In the preparation of the rectangular sheet A, the exact centers of its two sides and its two ends are determined. These points are designated C and D respectively, in Figure 4.

The sheet is then cut along the curved lines E and F and the sections designated G are removed therefrom.

The arcs of the lines of cut E and F are predetermined with respect to the dimensions of the rectangular blank, thus determining the area of the removed portions G.

The removed portions G are equal in area to what would constitute the excess material had these sections not been removed and instead a rectangular blank employed.

When a sheet of glass pre-formed in the foregoing described manner is placed in position upon the mould, it will rest upon the supporting bars 14 and flanges 16 at four points, namely, the points C—C and D—D respectively of the sheet.

When the mould with the pre-formed sheet in position thereas as described is subjected to the heat treatment, the sheet sags into the mould cavity and the excess material at the meeting edges of the angularly related sections displaces itself to positions where it compensates for the removed areas G and results in a defining edge for the open side of the finished product, which edge has the desired dimension and requires no finishing treatment.

In Figure 7 of the drawings, there is illustrated a skylight of conventional shape or form constructed in accordance with the present invention.

By reference to said Figure 7, it will be noted that the finished product comprises two end walls 20 which are substantially triangular in shape and two side walls 21 which are trapezoidal in shape, all terminating in a ridge, all of which walls are integrally connected and arranged in angularly related or intersecting planes. It is to be understood, however, that the invention is not to be limited solely to dome shaped structures of the type illustrated in Figure 7 and that it may be employed in the manufacture of dome-shaped structures of other shapes and forms.

Such a device may be secured in position upon the coaming of a skylight by suitable clips or in any other desired manner with the defining edge of its open side extending beyond the coaming of the skylight opening thereby to form a water shed.

From the foregoing, it will be apparent that the present invention provides a new and novel method of forming a skylight dome.

While the material employed has herein been described as wire mesh reenforced glass, it is to be understood that the invention is not to be limited to such material and that plain glass or plastic materials which lend themselves to deformation under the influence of heat may be employed.

Having thus described the invention, what I claim as new is:

1. The method of making a domelike article from a quadrangular flat sheet of plastic material which consists in removing from the ends and sides of said sheet portions adjacent the corners thereof and thus reducing the length of the perimeter of said sheet, and then subjecting the sheet to the action of heat and simultaneously bending it along a longitudinal center line terminating short of the ends of the sheet, and along lines extending from the ends of said center line to the corners, while holding the sides and ends of said sheet in fixed position.

2. The method of treating a quadrangular sheet of plastic material to form a dome-like structure which consists in shaping said sheet so that the sides and ends thereof are convex, then heating said sheet and simultaneously causing it to bend along a longitudinal center line which terminates short of said ends and along lines extending from the extremities of said center line to the corners, while simultaneously retaining the ends and sides of the sheet in fixed positions.

3. The method of treating a quadrangular flat sheet of plastic material to form a dome-like structure, said method consisting in shaping the sheet to make the sides and ends thereof convex, supporting said sheet at the sides and ends and simultaneously bending the sheet along the middle between said sides and ends and from the corners diagonally toward the middle of said sheet.

4. The method of making a skylight having converging side walls and sloping end walls, all of said walls being integral, which consists in providing a rectangular blank of flat glass, cutting the longitudinal and end edges of the blank on arcs to reduce the area of the blank and removing material at the corners thereof, supporting the cut blank of flat glass at the longitudinal sides of the blank and the ends of the blank, leaving the remainder of the area of the blank unsupported, and subjecting the blank to the action of sufficient heat to cause the glass blank to sag over its entire extent except along the edges and simultaneously arresting the sagging of the blank along a longitudinal line through the middle having its extremities short of the ends of the blank, and lines joining said extremities to the corners of the blank.

EDWARD SCHOTTLAND.

REFERENCES CITED

The following references are of record in the file of this patent:

UNITED STATES PATENTS

| Number | Name | Date |
|---|---|---|
| 497,574 | Heckert | May 16, 1893 |
| 499,082 | Armstrong | June 6, 1893 |
| 907,386 | Meeker | Dec. 22, 1908 |
| 1,180,383 | Eader | Apr. 25, 1916 |
| 1,489,729 | Aucremanne | Apr. 8, 1924 |
| 1,538,199 | Maxwell | May 19, 1925 |
| 1,787,460 | Wilcox | Jan. 6, 1931 |
| 2,175,653 | Williams | Oct. 10, 1939 |
| 2,189,006 | Hutchinson | Feb. 6, 1940 |
| 2,261,023 | Galey | Oct. 28, 1941 |
| 2,261,033 | Marshall | Oct. 28, 1941 |
| 2,389,360 | Guyer et al. | Nov. 20, 1945 |